(12) United States Patent
Chan et al.

(10) Patent No.: US 9,021,367 B2
(45) Date of Patent: Apr. 28, 2015

(54) METADATA CAPTURE FOR SCREEN SHARING

(75) Inventors: Yuk Chan, Poughkeepsie, NY (US); Tin H. To, Poughkeepsie, NY (US); Andrew Tsang, Poughkeepsie, NY (US); Wei Zhou, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 13/453,009

(22) Filed: Apr. 23, 2012

(65) Prior Publication Data
US 2012/0203854 A1 Aug. 9, 2012

Related U.S. Application Data

(63) Continuation of application No. 12/707,025, filed on Feb. 17, 2010.

(51) Int. Cl.
*G06F 3/00* (2006.01)
*G06F 3/14* (2006.01)

(52) U.S. Cl.
CPC .................................. *G06F 3/1454* (2013.01)

(58) Field of Classification Search
CPC .................................................... G06F 3/1454
USPC .......................................... 715/751, 759, 753
See application file for complete search history.

(56) References Cited

U.S. PATENT DOCUMENTS

| | | | |
|---|---|---|---|
| 5,758,110 A | 5/1998 | Boss et al. | |
| 7,200,592 B2 | 4/2007 | Goodwin et al. | |
| 7,293,243 B1 | 11/2007 | Ben-Shachar et al. | |
| 7,305,381 B1 | 12/2007 | Poppink et al. | |
| 7,467,164 B2 | 12/2008 | Marsh | |
| 7,580,930 B2 | 8/2009 | Brave et al. | |
| 7,711,722 B1 | 5/2010 | Sahasi et al. | |
| 8,127,365 B1 | 2/2012 | Liu et al. | |
| 8,478,767 B2 | 7/2013 | Kern et al. | |
| 8,589,423 B2 | 11/2013 | Kern et al. | |
| 2003/0028503 A1 | 2/2003 | Giuffrida et al. | |
| 2003/0179283 A1 | 9/2003 | Seidel et al. | |
| 2003/0189601 A1 | 10/2003 | Ben-Shachar et al. | |
| 2004/0158495 A1 | 8/2004 | Gennaro et al. | |
| 2006/0187228 A1 | 8/2006 | Jung et al. | |
| 2007/0168539 A1 | 7/2007 | Day | |
| 2008/0097984 A1 | 4/2008 | Candelore | |
| 2008/0097985 A1 | 4/2008 | Olstad et al. | |
| 2008/0189648 A1 | 8/2008 | Anglin et al. | |

(Continued)

OTHER PUBLICATIONS

PCT—International Search Report and Written Opinion of the International Searching Authority; Mar. 16, 2011; International Application No. PCT/EP2011/051493; pp. 1-8.

McLachlan et al., LiveRAC: Interactive Visual Exploration of System Management Time-Series Data, Apr. 5-10, 2008, pp. 1483-1492, CHI 2008 Proceedings, ACM, Florence, Italy.

(Continued)

*Primary Examiner* — Kieu Vu
*Assistant Examiner* — Aaron Lowenberger
(74) *Attorney, Agent, or Firm* — Cantor Colburn LLP; William A. Kinnaman, Jr.

(57) ABSTRACT

A method for metadata capture for screen sharing of a graphical user interface (GUI) screen includes determining by a screen share sending module a region of the GUI screen to be shared; analyzing the GUI screen by a metadata capture module to determine metadata relevant to the region to be shared; and sending a screen share of the region comprising the relevant metadata to a receiver by the screen share sending module.

20 Claims, 6 Drawing Sheets

(56) References Cited

U.S. PATENT DOCUMENTS

2008/0229180 A1    9/2008   Bhatt et al.
2010/0268694 A1   10/2010   Denoue et al.

OTHER PUBLICATIONS

Liapis, Synergy: A Prototype Collaborative Environment to Support the Conceptual Stages of the Design Process, 2008, pp. 149-156, Social and Collaborative Spaces, 3rd International Conference on Digital Interactive Media in Entertainment and Arts, DIMEA.

SCREEN CAPTURE INTERFACE

| SHARE WITHOUT METADATA | SHARE WITH METADATA | | CONFIGURATION |

408

MYCAPTURE   401

URL  http://answers.ibm.com/answers/threadview/id/70066.html   402

ENTER SEARCH HERE: How to mock up a GUI   403

Hi Jeff,

I have found a few software tools that I believe will allow you to achieve what you have described
404

○ My Disclosures by Status

Product A by Company A

Product B by Company B

Product C by Company C

Product D by Company D

Product E by Company E

Patent Tracking System:
405
●Create a New:
    -Disclsoure

●View my Disclosures
    -by Number
    -by Status
    -by Title
    -Archived ures to Evaluate ○ Infoprint Footprint Manager   406

Message from the Infoprint Manager Server:

Available MetaData for MyCapture

Internet Explorer
□ Title
□ URL
□ Search String
□ Link

IBM Infoprint Manager
□ Title: IBM infoprint Manager

IBM Lotus Notes
□ Title – My Disclosure by Status
□ User ID: myName

407

| SELECT ALL | SELECT NONE |

```
MyChat

> sending screen capture

MYCAPTURE    501

URL  http://answers.ibm.com/answers/threadview/id/70066.html  502

ENTER SEARCH HERE: How to mock up a GUI   503

Hi Jeff,

I have found a few software tools that I believe will allow you to
achieve what you have described
                                ○ My Disclosures by Status
  504
Product A by Company A           Patent Tracking System:

Product B by Company B           ●Create a New:
                                         -Disclsoure
Product C by Company C
                                 ●View my Disclosures
Product D by Company D                   -by Number
                                         -by Status      505
Product E by Company E                   -by Title
                                         -Archived
       ○ Infoprint Footprint Manager   506
                                              res to Evaluate
       Message from the Infoprint Manager
       Server:

> did you receive the screen capture?

Yes_
```

METADATA CAPTURE FOR SCREEN SHARING

CROSS-REFERENCES TO RELATED APPLICATIONS

This application is a continuation of U.S. application Ser. No. 12/707,025 filed on Feb. 17, 2010.

BACKGROUND

This disclosure relates generally to the field of screen sharing during online communication.

Screen sharing may be used to communicate information from a user's (or sender) graphical user interface (GUI) screen in, for example, an online chat or web conference. The screen share may comprise an image of the user's GUI screen that is sent to a receiver. The GUI screen may comprise metadata, including but not limited to confidentiality information, audit trail information, text, table cell color, a uniform resource locator (URL) link, a search query, or a persistent session ID. The metadata is not captured in the screen share image; for example, metadata such as selectable text or clickable URL links may be lost. The metadata must be captured and shared separately.

Different types of metadata require different capturing methods. For example, text may be highlighted and copied, table cell color may be extracted from HTML code, a search query may be copied from a search textbox, a URL link may be right clicked, and "Copy Link Location" selected, a screen capture of a bitmap may be extracted by pushing the printscreen key, or a session ID may be invisible, with no available extraction method. A sender of a screen share may not be able to extract more than one of type of metadata at a time. The receiver may determine some metadata via post processing and analysis of received screen share image, using, for example, optical character recognition (OCR) or lexicographic analysis. However, such analysis does not capture all types of metadata that are present in the sender's GUI screen at the time of the screen share, and may perform inefficiently or inaccurately. Therefore, in an instant messaging scenario, the sender may need to copy and paste the metadata information separately and manually to the receiving party, which limits the usefulness of the screen share. In a web conference scenario, the meeting host may not be able to copy and paste metadata without interrupting the realtime nature of the web conference.

SUMMARY

An exemplary embodiment of a method for metadata capture for screen sharing of a graphical user interface (GUI) screen includes determining by a screen share sending module a region of the GUI screen to be shared; analyzing the GUI screen by a metadata capture module to determine metadata relevant to the region to be shared; and sending a screen share of the region comprising the relevant metadata to a receiver by the screen share sending module.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of methods for metadata capture for screen sharing are provided, with exemplary embodiments being discussed below in detail.

Capture of metadata may be performed automatically in a screen share of a GUI screen, rather than through manual copying and pasting by the sender. The sender may select a region within the GUI screen for which metadata is to be extracted, or the sender may select the entire GUI screen. Once a region of the screen is selected, object recognition technology is applied to the selected region, and to objects outside of the selected region that are relevant to the selected region, to recognize and capture the metadata. Some or all of the captured metadata may be sent to a receiver along with the screen share, according to the sender's preferences. The metadata may be rendered in the receiver's system as HTML, an image map, native object, or any other desired format. The captured metadata is ready for use by the receiver, without the need for additional processing. Metadata may be captured across traditional boundaries, such as windows, frames, images or tables, and from outside of the designated metadata capture region. The metadata may be captured and shared in a real-time, collaborative environment, to enhance and simplify collaboration and information sharing.

Metadata may include but is not limited to authorship information, confidentiality information, audit trail information, table cell color, a persistent session ID, text (including characteristics such as content, font size, or line spacing), window information such as title or whether the window is minimized/maximized, or any other application specific information, such as a search string URL for a browser application. Shared metadata may be re-rendered in the most appropriate format with respect to the application from which the metadata is extracted. For example, captured metadata may be presented to appear as if it is on its native application. Application specific support for application windows in the screen share may be provided through application specific plugins. For example, when sharing a Power Point® presentation or Microsoft Office® document, metadata such as author or last modified date may be shared. When sharing a browser window, a mechanism may be used that that introspects the HTML document described by a standard format such as document object model (DOM). When sharing a webpage with persistence and shareable sessions, the URL to access the session may also be sent as metadata.

Figure 1:
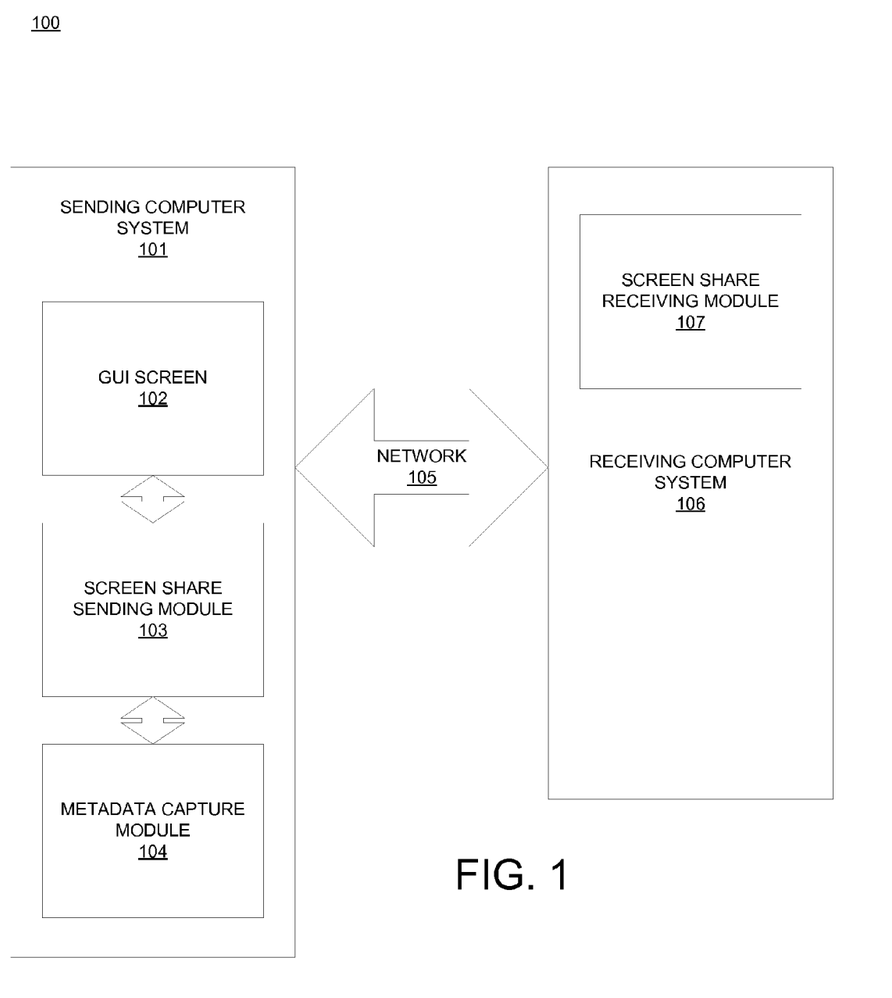
FIG. 1 illustrates an embodiment of a system for metadata capture for screen sharing.

FIG. 1 illustrates an embodiment of a system 100 for capturing metadata for screen sharing. Sending computer system 101 comprises a GUI screen 102. A user may select some or all of GUI screen 102 for a screen share. Screen share sending module 103 invokes metadata capture module 104 to identify the metadata present in the selected region of GUI screen 102. Screen share sending module 103 then applies the user's preferences to the identified metadata, and shares the screen share with the desired metadata with receiving computer system 106 via network 105. The screen share and metadata are displayed to the receiver via screen share receiving module 107, which may comprise a chat or web conferencing application in some embodiments.

Metadata capture module 104 may implement any appropriate GUI object navigation technology to determine properties such as location, size, content, and visibility of objects in the GUI screen 102. By determining each object's coordinates in the GUI screen, metadata capture module 104 may determine if an object is within the selected region, partially within the region, or relevant to the selected region. The metadata capture module 104 may then capture metadata from objects determined to be within or relevant to the selected region. Metadata capture module 104 may implement technology including but not limited to object map from the .NET framework, Rational Function Tester, Spy++, Public Application Programming Interface (API), Microsoft Foundation Class (MFC), or SpyLib in some embodiments.

Figure 2:
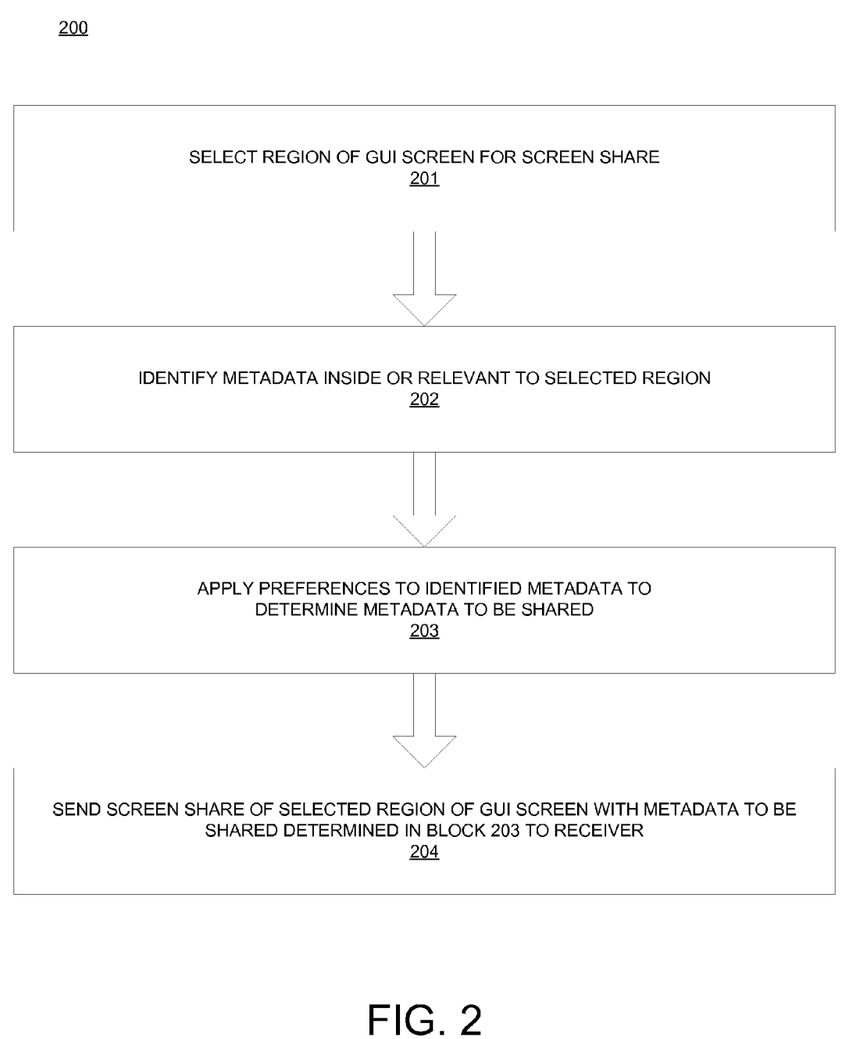
FIG. 2 illustrates an embodiment of a method for metadata capture for screen sharing.

FIG. 2 illustrates an embodiment of a method 200 for capturing metadata for screen sharing. FIG. 2 is discussed with reference to FIG. 1. In block 201, a sender selects a region of a GUI screen 102 to be shared as a screen share. The selected region may comprise a portion of GUI screen 102, or all of GUI screen 102. In block 202, the selected region is analyzed by metadata capture module 104 to identify any metadata present in the selected region, and in any region of the GUI screen 102 relevant to the selected region if the selected region is less than the entire GUI screen 102. Data not currently visible in the GUI screen 102, but that may be made visible by scrolling, may also be captured. In block 203, the sender's preferences regarding which metadata to share in the screen share are determined and applied to the identified metadata to determine the metadata to be shared by screen share sending module 103. The sender preferences may be entered by the user at the time of the screen share, by, for example, displaying a list of available metadata to the user, or the preferences may comprise a previously stored set of preferences. In block 204, the screen share is transmitted by screen share sending module 103 to screen share receiving module 107 on receiving computer system 106 along with the metadata to be shared that was determined in block 203.

Figure 3:
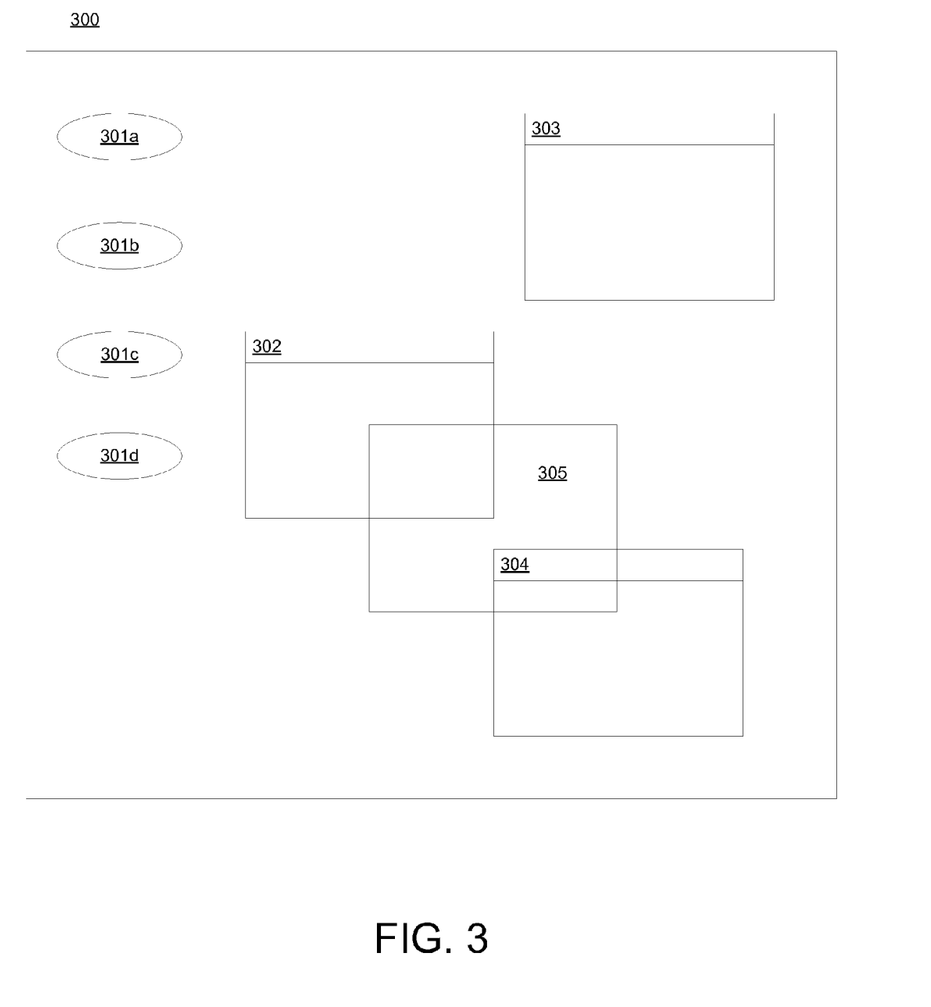
FIG. 3 illustrates an embodiment of a GUI screen with a region selected for screen sharing.

Metadata may be captured from any portion of the GUI screen 102 that is determined to be relevant to the region of the GUI screen that is selected in block 201. FIG. 3 shows an embodiment of a GUI screen 300 with a region 305 of the GUI screen 300 selected for metadata capturing. GUI screen 300 comprises various objects, including icons 301a-d and windows 302-304. The selected region 305 may be selected in any appropriate manner, for example, clicking and dragging a mouse to form a box on a computer screen, or by making a circular region with finger on a touch-screen device in some embodiments. A selected region 305 may comprise any portion or all of GUI screen 300. In FIG. 3, selected region 305 includes portions of windows 302 and 304. Therefore, in a metadata capture for a screen share of region 305, any metadata regarding windows 302 and 304 may be captured, whether the metadata is actually located inside of region 305 or not, as any metadata regarding windows 302 and 304 is relevant to objects located inside region 305. Information regarding icons 301a-d and window 303, however, may not be captured.

Figure 4:
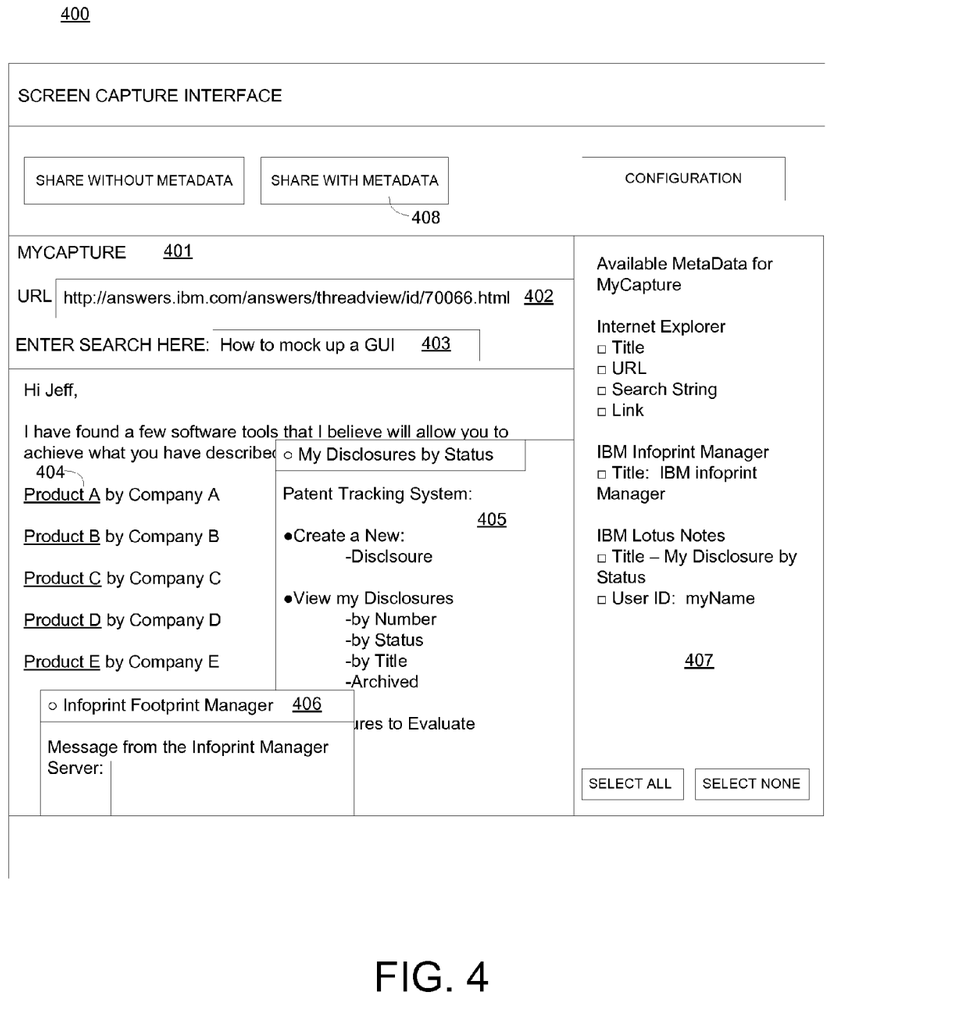
FIG. 4 illustrates an embodiment of a sender interface for metadata capture for screen sharing.

The sender may designate preferences regarding the type and amount of metadata from selected region 305 to share. This may be accomplished via a sender interface such as is shown in FIG. 4. FIG. 4 illustrates an embodiment of a sender interface 400 for capturing metadata. Interface 400 may be launched when a sender selects a region of a GUI screen for metadata capture; however, interface 400 is shown for illustrative purposes only, metadata capture may be performed via any appropriate interface. Interface 400 comprises MyCapture 401, which corresponds to the selected region of the sender's GUI screen, such as selected region 305 of FIG. 3. MyCapture 401 comprises a web browser application having a URL 402, a search string 403, and various clickable links such as clickable link 404. MyCapture 401 also comprises applications MyDisclosures 405 and Infoprint Footprint Manager 406. Available metadata window 407 lists the metadata available in MyCapture 401, and allows the sender to use checkboxes to designate which of the listed metadata to send in a screen share of MyCapture 401. Once the user has selected the desired metadata for sending with the screen share, the user may select "Share With Metadata" button 408.

Figure 5:
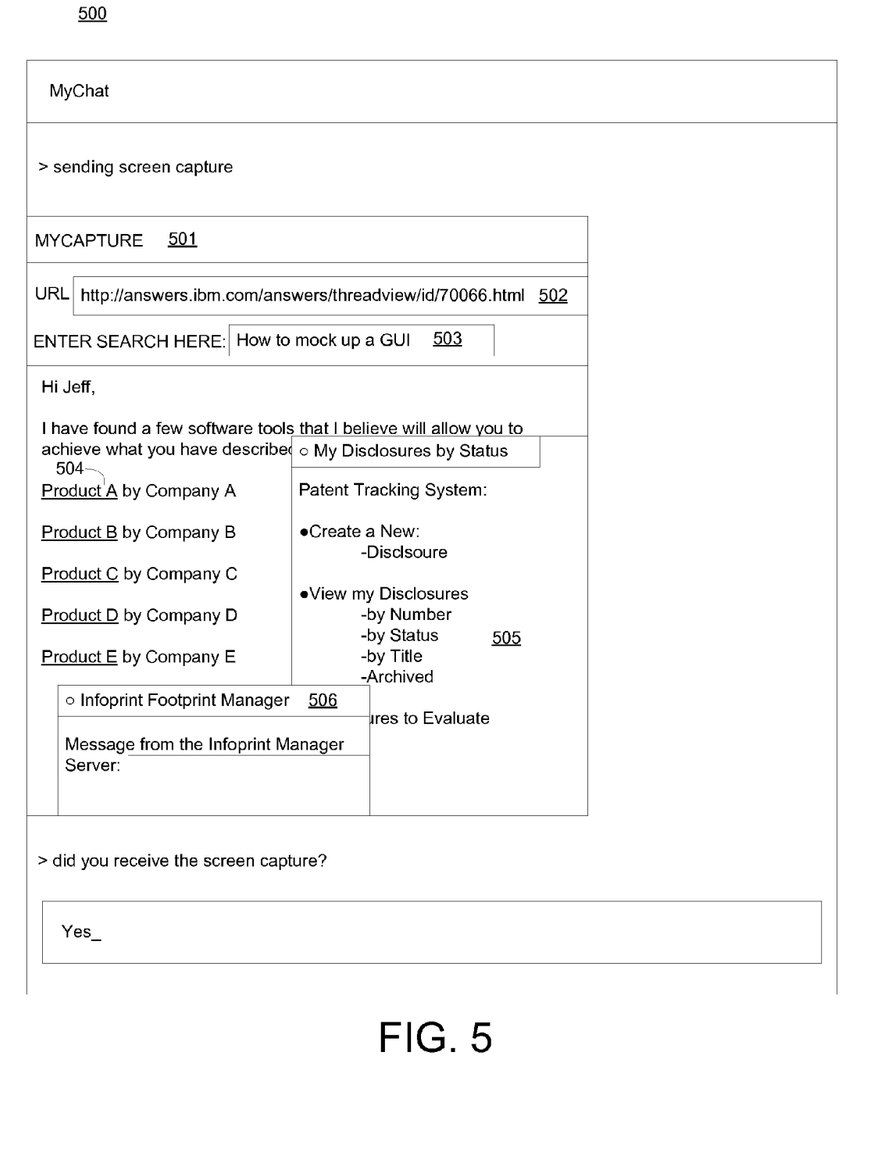
FIG. 5 illustrates an embodiment of a receiver interface for metadata capture for screen sharing.

FIG. 5 illustrates an embodiment of a receiver interface 500 for receiving a screen share 501 comprising captured metadata. Receiver interface 500 comprises a chat window; however, receiver interface 500 is shown for illustrative purposes only, a screen share 501 comprising metadata may be received in type of communication. Screen share 501 corresponds to MyCapture 401 as is shown in FIG. 4, and comprises selectable URL link 502, copyable search string 503, clickable link 502, and information regarding applications 505 and 506.

Referring again to FIG. 1, the following code segment shows an embodiment of computer code that may be embodied in metadata capture module 104 to capture all metadata in a window:

```
Windows using the ManagedSpyLib (available for free from MSDN):
using System;
using System.Text;
using System.Diagnostics;
using System.Windows.Forms;
using System.Collections.Generic;
using Microsoft.ManagedSpy;
class Program
{
    static void Main(string[ ] args)
    {
        Dictionary<int, int> topWindowCounts = new Dictionary<int, int>( );
        foreach (ControlProxy proxy in ControlProxy.TopLevelWindows)
        {
            if (!topWindowCounts.ContainsKey(proxy.OwningProcess.Id))
            {
```

```
            topWindowCounts.Add(proxy.OwningProcess.Id, 0);
        }
            topWindowCounts[proxy.OwningProcess.Id]++;
        }
    foreach (int pid in topWindowCounts.Keys)
    {
        Process p = Process.GetProcessById(pid);
        Console.WriteLine("Process:"+p.ProcessName+"has"+
            topWindowCount[pid].TString( ) + "top level windows");
    }
  }
}
```

The following code segment shows an embodiment an embodiment of computer code that may be embodied in metadata capture module 104 to capture metadata for a button in a selected region:

```
foreach (Process p in
Process.GetProcessesByName("WindowsApplication1"))
{
    if (p.Id != Process.GetCurrentProcess( ).Id)
    {
        ControlProxy proxy =
        ControlProxy.FromHandle(p.MainWindowHandle);
        string val = (string)proxy.GetValue("MyStringValue");
        .....
    }
}
```

The above code segments are shown for illustrative purposes only; metadata capture module 104 may implement any appropriate metadata recognition technology.

Figure 6:
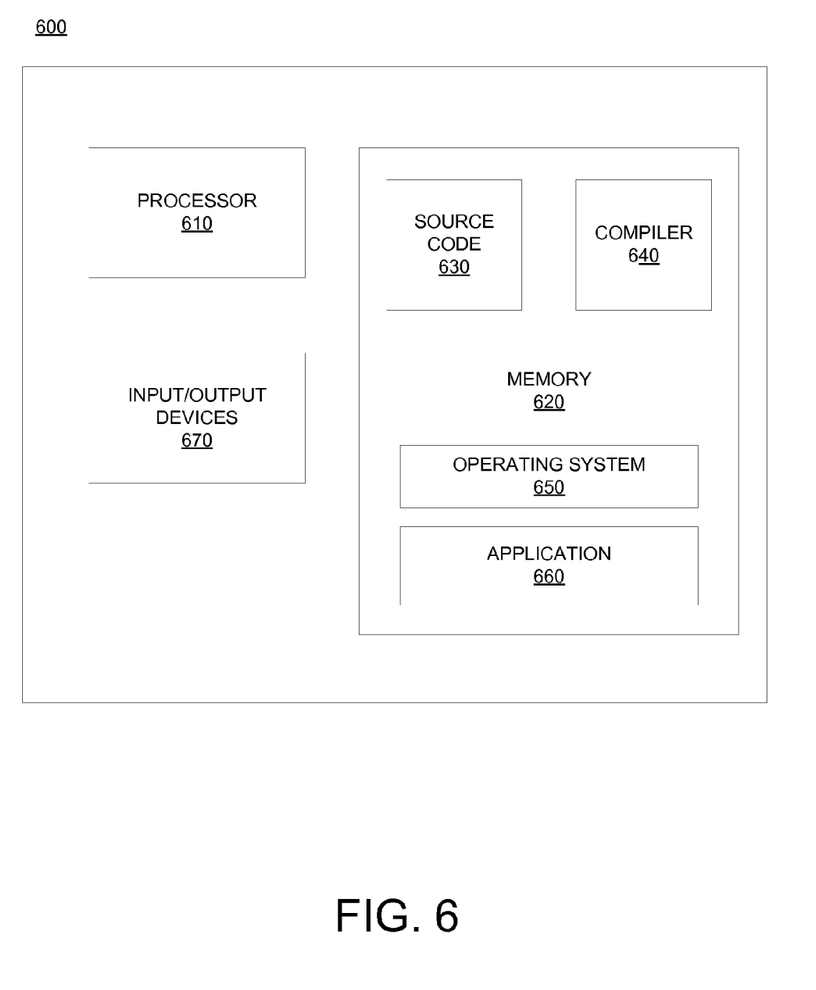
FIG. 6 illustrates an embodiment of a computer that may be used in conjunction with systems and methods for metadata capture for screen sharing.

FIG. 6 illustrates an example of a computer 600 which may be utilized by exemplary embodiments of systems and methods for metadata capture for screen sharing as embodied in software. Various operations discussed above may utilize the capabilities of the computer 600. One or more of the capabilities of the computer 600 may be incorporated in any element, module, application, and/or component discussed herein.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/ demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include automatic sending of metadata information in a screen sharing application without interrupting real-time communication.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for metadata capture for screen sharing of a graphical user interface (GUI) screen, the method comprising:
   determining by a screen share sending module a region of the GUI screen to be shared, wherein the region comprises less than the entire GUI screen;
   using object recognition to analyze the GUI screen by a metadata capture module to determine metadata relevant to the region to be shared, wherein the determined metadata comprises at least a universal resource locator (URL), a search string, and a link, wherein a first portion of the determined metadata is located inside the region of the GUI screen, and wherein a second portion of the determined metadata is located in a visible portion of the GUI screen outside of the region of the GUI screen;
   sending a screen share of the region comprising the determined metadata to a receiver by the screen share sending module; and
   receiving the screen share of the region comprising the determined metadata by a screen share receiving module, wherein the received screen share comprises the first portion of the determined metadata in the same format in which it is presented in the GUI screen, and wherein the first portion and the second portion of the determined metadata comprising the screen share are available to a user at the receiver.

2. The method according to claim 1, further comprising:
   determining a list of the determined metadata relevant to the region to be shared by the object recognition;
   displaying the list of the determined metadata to a sender of the screen share, wherein the list of the relevant metadata comprises a first piece of metadata regarding a window and a second piece of metadata regarding said window;

receiving a selection of the first piece of metadata from the sender; and sending the screen share of the region with the determined metadata comprising the first piece of metadata and not the second piece of metadata regarding the window.

3. The method according to claim 1, wherein a third portion of the determined metadata is located in the GUI screen outside of the visible portion of the GUI screen, and wherein the third portion of the determined metadata comprising the screen share is available to the user at the receiver.

4. The method according to claim 1, further comprising applying a set of stored preferences to the determined metadata to determine a set of preferred metadata, and sending the screen share of the region with the set of preferred metadata designated by the set of stored preferences.

5. The method according to claim 1, wherein the relevant metadata comprises authorship of a document.

6. The method according to claim 1, wherein the screen share is sent as part of a web conference or chat session.

7. The method according to claim 1, wherein the relevant metadata comprises confidentiality information.

8. The method according to claim 1, wherein the relevant metadata comprises audit trail information.

9. The method according to claim 1, wherein the relevant metadata comprises table cell color.

10. The method according to claim 1, wherein the relevant metadata comprises a persistent session ID.

11. The method according to claim 1, wherein the relevant metadata comprises text content.

12. The method according to claim 1, wherein the relevant metadata comprises text font size.

13. The method according to claim 1, wherein the relevant metadata comprises text line spacing.

14. The method according to claim 1, wherein the relevant metadata comprises window title.

15. The method according to claim 1, wherein the relevant metadata comprises whether a window is minimized or maximized.

16. The method according to claim 1, further comprising selecting the URL by a user at the screen share receiving module.

17. The method according to claim 1, further comprising copying the search string by a user at the screen share receiving module.

18. The method according to claim 1, further comprising clicking the link by a user at the screen share receiving module.

19. A computer program product comprising a non-transitory computer readable storage medium containing computer code that, when executed by a computer, implements a method for metadata capture for screen sharing of a graphical user interface (GUI) screen, wherein the method comprises:

determining by a screen share sending module a region of the GUI screen to be shared, wherein the region comprises less than the entire GUI screen;

using object recognition to analyze the GUI screen by a metadata capture module to determine metadata relevant to the region to be shared, wherein the determined metadata comprises at least a universal resource locator (URL), a search string, and a link, wherein a first portion of the determined metadata is located inside the region of the GUI screen, and wherein a second portion of the determined metadata is located in a visible portion of the GUI screen outside of the region of the GUI screen;

sending a screen share of the region comprising the determined metadata to a receiver by the screen share sending module; and receiving the screen share of the region comprising the determined metadata by a screen share receiving module, wherein the received screen share comprises the first portion of the determined metadata in the same format in which it is presented in the GUI screen, and wherein the first portion and the second portion of the determined metadata comprising the screen share are available to a user at the receiver.

20. A computer system for metadata capture for screen sharing of a graphical user interface (GUI) screen, the system comprising:

a memory; and a processor, communicatively coupled to said memory, the computer system configured to perform a method comprising:

determining by a screen share sending module a region of the GUI screen to be shared, wherein the region comprises less than the entire GUI screen;

using object recognition to analyze the GUI screen by a metadata capture module to determine metadata relevant to the region to be shared, wherein the determined metadata comprises at least a universal resource locator (URL), a search string, and a link, wherein a first portion of the determined metadata is located inside the region of the GUI screen, and wherein a second portion of the determined metadata is located in a visible portion of the GUI screen outside of the region of the GUI screen;

sending a screen share of the region comprising the determined metadata to a receiver by the screen share sending module; and receiving the screen share of the region comprising the determined metadata by a screen share receiving module, wherein the received screen share comprises the first portion of the determined metadata in the same format in which it is presented in the GUI screen, and wherein the first portion and the second portion of the determined metadata comprising the screen share are available to a user at the receiver.

* * * * *